United States Patent [19]

Hayashi

[11] 4,450,709

[45] May 29, 1984

[54] INTERNAL COMBUSTION ENGINE WITH ENGINE KNOCK SENSOR

[75] Inventor: Yoshimasa Hayashi, Kamakura, Japan

[73] Assignee: Nissan Motor Co. Ltd., Yokohama, Japan

[21] Appl. No.: 437,464

[22] Filed: Oct. 28, 1982

[30] Foreign Application Priority Data

Nov. 5, 1981 [JP] Japan ............................ 56-165112[U]

[51] Int. Cl.³ ............................................ G01L 23/22
[52] U.S. Cl. ....................................................... 73/35
[58] Field of Search ..................... 73/35; 123/425, 435

[56] References Cited

U.S. PATENT DOCUMENTS

| 4,153,020 | 5/1979  | King et al. .......................... 73/35 X |
| 4,225,802 | 9/1980  | Suzuki et al. ....................... 310/321 |
| 4,382,377 | 5/1983  | Kleinschmidt et al. ............... 73/35 |
| 4,408,479 | 10/1983 | Asai et al. .............................. 73/35 |

FOREIGN PATENT DOCUMENTS 2716712 10/1978 Fed. Rep. of Germany .
401587 11/1933 United Kingdom .
598360 2/1948 United Kingdom .

Primary Examiner—James J. Gill

[57] ABSTRACT

An internal combustion engine comprises a cylinder head having a cylinder wall section defining therein a cylinder bore, and an outer wall section, forming therebetween an engine coolant passage. The cylinder wall section is formed with a boss section to which an engine knock sensor is rigidly connected. The cylinder block outer wall section is formed with an opening at a location generally corresponding to the boss section to separate the boss section from the cylinder block outer wall section. Additionally, a resilient seal member is disposed between the cylinder block outer wall section and the engine knock sensor to prevent engine coolant from leaking through the outer wall section opening. Accordingly, the engine knock sensor is directly subjected to engine knock vibration, thereby greatly improving engine knock sensing accuracy without being affected by noise vibrations.

9 Claims, 3 Drawing Figures

INTERNAL COMBUSTION ENGINE WITH ENGINE KNOCK SENSOR

BACKGROUND OF THE INVENTION

1. Field of the Invention

This invention relates in general to an improvement in a spark-ignition internal combustion engine, and more particularly to the installation location of an engine knock sensor for detecting engine knock.

2. Description of the Prior Art

In connection with spark-ignition internal combustion engines, particularly used for automotive vehicles, it is well known to employ an engine knock preventing system which suitably retards spark timings in response to detected engine knock, thereby preventing continuation of the engine knock. Such engine knock detection is usually carried out by an engine knock sensor located at the outer wall section of a cylinder block. However, a difficulty has been encountered with the thus located engine knock sensor, in which sufficient sensing accuracy is not obtained since the engine knock sensor is not in direct contact with an engine cylinder wall which is subjected to engine knock.

SUMMARY OF THE INVENTION

An internal combustion engine according to the present invention comprises a cylinder block having a cylinder wall section defining therein a cylinder bore, and an outer wall section located outside of the cylinder wall section. An engine coolant passage is formed between the cylinder wall section and the outer wall section. A boss section is formed at and projects from the cylinder block cylinder wall section, the boss section being formed with a threaded portion. An opening is formed at the cylinder block outer wall section and located at a position generally corresponding to the boss section to prevent the boss section from contacting the cylinder block outer wall section. Additionally, an engine knock sensor is provided to sense engine knock and has a threaded portion which engages with the threaded portion of the boss section. A resilient seal member is disposed between the engine knock sensor and the cylinder block outer wall section to prevent engine coolant from leaking through the cylinder block outer wall section opening.

Accordingly, the engine knock sensor is located to be directly subjected to engine knock, thereby improving engine knock sensing accuracy without being affected by noise vibration from a valve operating mechanism.

BRIEF DESCRIPTION OF THE DRAWINGS

The features and advantages of the internal combustion engine according to the present invention will be more clearly appreciated from the following description taken in conjunction with the accompanying drawings in which like reference numerals designate corresponding parts or elements, and in which.

DETAILED DESCRIPTION OF THE INVENTION

Figure 1:
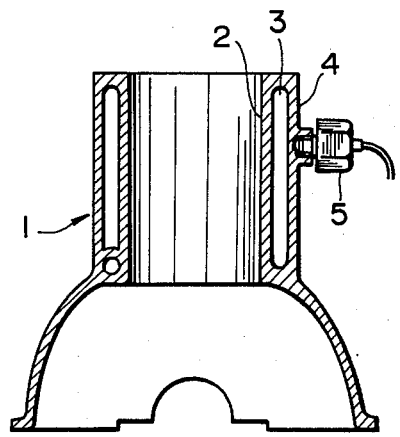
FIG. 1 is a vertical sectional view of a conventional spark-ignition internal combustion engine provided with an engine knock sensor.

To facilitate understanding the present invention, a brief reference will be made to a part of a conventional spark-ignition internal combustion engine of the water-cooled type, depicted in FIG. 1. Referring to FIG. 1, a cylinder block 1 of the engine includes a cylinder wall section 2 and an outer wall section 4, forming therebetween an engine coolant passage 3. An engine knock sensor 5 is installed to the cylinder block outer wall section 4 to sense engine knock vibration. However, with the thus located engine knock sensor 5, a sufficient sensing accuracy cannot be obtained for the reasons set forth below. When the engine knock sensor 5 is installed at the above-mentioned location, high frequency engine knock vibration (about 6-10 KHz in automotive engines) tends to be greatly damped during its transmission from the cylinder wall section 2 to the outer wall section 4 of the cylinder block 1. As a result, it is impossible to detect weak and fine vibration at the initial period of engine knock. Besides, the thus located engine knock sensor 5 is liable to be subjected to noise vibration from a valve operating mechanism in a cylinder head (not shown), and as such S(signal due to engine knock)/N (noise) of the output of the engine knock sensor 5 unavoidably lowers.

Figure 2:
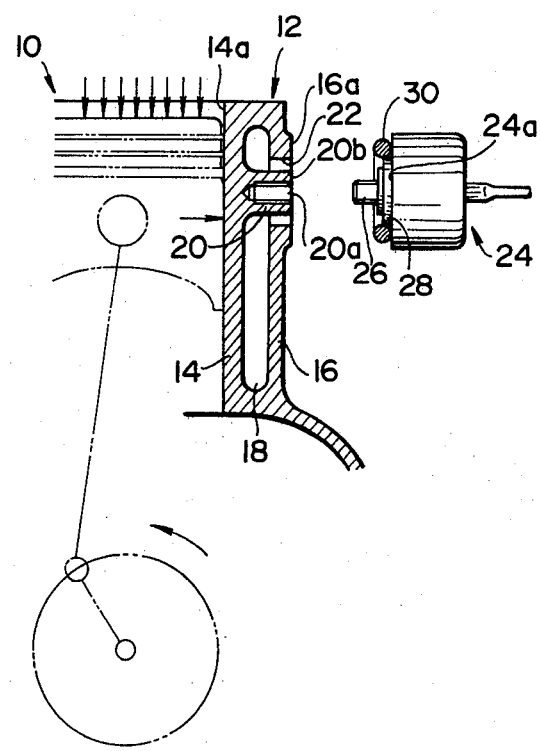
FIG. 2 is a fragmentary sectional view showing the essential part of a preferred embodiment of a spark-ignition internal combustion engine according to the present invention, provided with an engine knock sensor.

In view of the above description of the conventional engine with the engine knock sensor, reference is now made to FIG. 2 wherein a preferred embodiment of an internal combustion engine according to the present invention is illustrated by the reference numeral 10. The engine 10 of this embodiment is of the water-cooled and spark-ignition type and used for an automotive vehicle. The engine 10 comprises a cylinder block 12 which is formed with a plurality of cylinder wall sections 14 each of which defines therein a cylinder bore 14a. The cylinder wall sections 14 are surrounded by an outer wall section 16, forming therebetween an engine coolant passage or water jacket 18.

In this embodiment, one of the cylinder wall sections 14 is integrally formed at its outer surface with a boss section 20 which projects outwardly so that the tip surface 20b thereof is generally on the same plane as the flat surface portion 16a formed at the outer surface of the outer wall section 16. This is advantageous because the tip surface 20b of the boss portion 20 and the outer wall section flat surface portion 16a can be simultaneously machined to obtain smooth surfaces. The boss section 20 is formed with a hole 20a having an interior screw which hole extends along the axis of the boss section. The outer wall section 16 is formed with an opening 22 which is so located that the boss portion 20 is disposed in the opening 22, leaving an annular space around the boss portion 20.

An engine knock sensor 24 for sensing vibration due to engine knock is provided with a straightly projected section 26 with an exterior screw which section 26 extends in the direction of axis of the engine knock sensor 24. When the engine knock sensor 24 is installed in position, the projected section 26 is disposed into the boss section hole 20a so that the exterior screw of the former engages with the interior screw of the latter. Additionally, the engine knock sensor 24 is formed with a thin cylindrical small diameter section 28 which is coaxial with the projected section 26. An annular resilient seal member or O-ring 30 is disposed along the outer periphery of the small diameter section 28 and seated on the flat surface 24a of the sensor 24 which surface faces the flat surface portion 16a of the cylinder block outer wall section 16 when the engine knock sensor 24 is installed in position. The annular seal member 30 is so located and has such an inner diameter as to surround the opening 22 of the cylinder block outer wall section 16 when the sensor 24 is installed in position. It will be understood that when the sensor projected section 26 is screwed into the boss portion hole 20a to tighten the screws of both, the seal member 30 is pressed in some extent between the flat surface portion 16a of the cylinder block outer wall section 16 and the flat surface 24a of the engine knock sensor 24, thereby providing an appropriate fluid-tight seal.

With the thus arranged engine, when engine knock is generated, vibration of the cylinder wall section 14 is directly applied to the engine knock sensor 24, thereby effectively detecting engine knock. Additionally, noise vibration at the cylinder block outer wall section is absorbed by the resilient seal member 30 and, as such the engine knock sensor 24 is hardly affected by such noise vibration. As a result, the engine knock sensor installed as above-mentioned can detect fine and weak engine knock vibration, thus greatly improving engine knock sensing accuracy. Besides, the resilient seal member 30 can elastically deform upon receiving relative vibration between the cylinder block outer wall section 16 and the engine knock sensor 24, and therefore it is kept in tight contact with the flat surface portion 16a of the cylinder block outer wall section 16 and with the flat surface 24a of the engine knock sensor 24, thus effectively preventing engine coolant from leaking.

Figure 3:
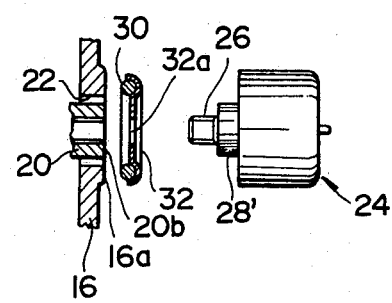
FIG. 3 is a fragmentary sectional view showing the essential part of another embodiment of the engine in accordance with the present invention.

FIG. 3 shows another embodiment of the engine knock sensor 24 according to the present invention, in which the annular resilient seal member 30 is seated on a washer or metallic seat 32 and urged through the washer 32 into tight contact with the flat surface portion 16a of the cylinder block outer wall section 16 when the engine knock sensor 24 is installed in position. As shown, the washer 32 is of the annular shape, and formed with a central opening 32a and an annular groove (no numeral) in which the annular seal member 30 is located. When the engine knock sensor 24 is installed in position, the washer 32 is interposed between the tip surface 20b of the boss section 20 and the small diameter section 28' of the sensor 24 while locating the sensor projected section 26 in the washer central opening 32a. Accordingly, the resilient seal member 30 is brought into tight contact with the flat surface portion 16a of the cylinder block outer wall section 16 by virtue of the elasticity of the washer 32.

Thus, with this embodiment, the resilient seal member 30 is prevented from being distorted when the projected section 26 of the engine knock sensor 24 is screwed into the boss portion 20 of the cylinder block 12. Additionally, the contact of the resilient seal member 30 is tightened by an amount corresponding to resiliency of the washer 32, thereby improving the reliability of fluid-tight seal.

As will be appreciated from above, according to the present invention, the engine knock sensor installation boss portion is formed at the cylinder wall section of the cylinder block which wall is directly subjected to gas pressure vibration when engine knock occurs. This increases engine knock vibration level applied to the engine knock sensor, thereby noticeably improving engine knock sensing accuracy.

What is claimed is:
1. An internal combustion engine comprising:
  a cylinder block having a cylinder wall section defining thereinside a cylinder bore, and an outer wall section located outside of said cylinder wall section, an engine coolant passage being formed between said cylinder wall and outer wall sections;
  a boss section formed at and projecting from said cylinder wall section, said boss section being formed with a threaded portion;
  means defining an opening at said cylinder block outer wall section, said opening being located at a position generally corresponding to said boss section to prevent said boss section from contacting said cylinder block outer wall section;
  an engine knock sensor having a threaded portion which engages with the threaded portion of said boss section; and
  a resilient seal member disposed between said engine knock sensor and said cylinder block outer wall section to prevent engine coolant from leaking through said cylinder block outer wall section opening.

2. An internal combustion engine as claimed in claim 1, wherein said engine knock sensor has a projected section formed with said threaded portion, said projected section being disposed in a hole of said boss section which hole is formed with said threaded portion.

3. An internal combustion engine as claimed in claim 2, wherein said boss section is located in said opening of said cylinder block outer wall section, leaving an annular space around said boss section.

4. An internal combustion engine as claimed in claim 3, wherein said boss section so extends that the tip surface thereof is on the same plane as a flat surface portion of said cylinder block outer wall surface at the location around said opening.

5. An internal combustion engine as claimed in claim 4, wherein said engine knock sensor is formed with a flat surface which faces the flat surface portion of said cylinder block outer wall section.

6. An internal combustion engine as claimed in claim 5, wherein said resilient member is an O-ring located between the flat surface portion of said cylinder block outer wall section and the flat surface of said engine knock sensor.

7. An internal combustion engine as claimed in claim 6, wherein said engine knock sensor is formed with a thin cylindrical section along the periphery of which said O-ring is disposed.

8. An internal combustion engine as claimed in claim 4, wherein further comprising a washer member having a central opening through which said engine knock sensor projected section is disposed, and an annular groove in which said resilient seal member is disposed.

9. An internal combustion engine as claimed in claim 8, wherein said engine knock sensor is formed with a cylindrical section whose diameter is larger than that of said washer member central opening, said washer member being located between said boss section tip surface and said engine knock sensor cylindrical section.

* * * * *